US010919189B2

(12) United States Patent
Wendeln et al.

(10) Patent No.: US 10,919,189 B2
(45) Date of Patent: Feb. 16, 2021

(54) BIOCOMPOSITE AND/OR BIOMATERIAL WITH SUNFLOWER SEED SHELLS/HUSKS

(71) Applicant: SPC SUNFLOWER PLASTIC COMPOUND GMBH, Garrel (DE)

(72) Inventors: Ulrich Wendeln, Garrel (DE); Ulrich Meyer, Garrel (DE)

(73) Assignee: SPC SUNFLOWER PLASTIC COMPOUND GMBH, Garrel (DE)

( * ) Notice: Subject to any disclaimer, the term of this patent is extended or adjusted under 35 U.S.C. 154(b) by 0 days.

(21) Appl. No.: 15/896,529

(22) Filed: Feb. 14, 2018

(65) Prior Publication Data

US 2018/0169908 A1 Jun. 21, 2018

Related U.S. Application Data

(62) Division of application No. 14/356,980, filed as application No. PCT/EP2012/070348 on Oct. 12, 2012.

(30) Foreign Application Priority Data

Nov. 14, 2011 (DE) .................. 10 2011 086 319
Jun. 5, 2012 (DE) .................. 10 2012 209 482

(51) Int. Cl.
| | | |
|---|---|---|
| *B29C 41/04* | (2006.01) | |
| *B29C 48/00* | (2019.01) | |
| *C08L 23/12* | (2006.01) | |
| *C08J 3/00* | (2006.01) | |
| *C08J 3/20* | (2006.01) | |
| *C08K 5/00* | (2006.01) | |
| *C08L 99/00* | (2006.01) | |
| *B29C 45/00* | (2006.01) | |
| *B29C 51/00* | (2006.01) | |
| *B65D 1/48* | (2006.01) | |
| *B65D 85/72* | (2006.01) | |
| *B29K 23/00* | (2006.01) | |
| *B29K 105/00* | (2006.01) | |

(52) U.S. Cl.
CPC .......... *B29C 41/04* (2013.01); *B29C 45/0001* (2013.01); *B29C 48/022* (2019.02); *B29C 51/002* (2013.01); *B65D 1/48* (2013.01); *B65D 85/72* (2013.01); *C08J 3/005* (2013.01); *C08J 3/203* (2013.01); *C08K 5/005* (2013.01); *C08L 23/12* (2013.01); *C08L 99/00* (2013.01); *B29K 2023/12* (2013.01); *B29K 2093/00* (2013.01); *B29K 2105/25* (2013.01); *C08J 2399/00* (2013.01); *C08J 2423/00* (2013.01); *C08L 2205/08* (2013.01); *Y10T 428/1348* (2015.01); *Y10T 428/2982* (2015.01)

(58) Field of Classification Search
CPC ...................................................... C08L 99/00
See application file for complete search history.

(56) References Cited

U.S. PATENT DOCUMENTS

| | | | |
|---|---|---|---|
| 3,927,235 A | 12/1975 | Chow | |
| 5,320,669 A | 6/1994 | Lim et al. | |
| 5,663,221 A | 9/1997 | Barcas | |
| 2002/0028857 A1* | 3/2002 | Holy | B29C 49/00 523/124 |
| 2009/0110654 A1 | 4/2009 | Hagemann et al. | |

FOREIGN PATENT DOCUMENTS

| | | |
|---|---|---|
| CA | 2721574 | 10/2009 |
| EP | 2 976 790 | 2/2000 |
| JP | 2011-515605 | 5/2011 |
| JP | 2011-518266 | 6/2011 |
| UA | 29511 | 1/2008 |
| WO | WO 2009/120311 | 10/2009 |
| WO | WO 2009/129051 | 10/2009 |

OTHER PUBLICATIONS

International Search Report for Application No. PCT/EP2012/070348 dated Mar. 20, 2013.
Céline Geneau-Sbartaï et al: "Sunflower Cake as a Natural Composite: Composition and Plastic Properties", Journal of Agricultural and Food Chemistry, vol. 56, No. 23, Dec. 10, 2008 (Dec. 10, 2008), pp. 11198-11208, XP055045769, ISSN: 0021-8561, DOI: 10.1021/jf8011536 figures 10,11; table 2.
Japanese Notice of Grounds for Rejection for Application No. 2014-54036 dated Sep. 6, 2016.
Ukraine Office Action dated Nov. 8, 2016 regarding the corresponding patent application No. a2014 06601.

* cited by examiner

*Primary Examiner* — Arrie L Reuther
(74) *Attorney, Agent, or Firm* — Haug Partners LLP

(57) ABSTRACT

The invention relates to a biomaterial and/or a biocomposite based on sunflower seed shells/husks. According to the invention, it is proposed that sunflower seed shells/husks are used instead of wood, bamboo or other wood-like fiber products as the original material for the biocomposite products and are used for the production of such products in order to improve the previous biomaterials, and in particular also to design said materials for improved cost efficiency and to improve their material properties.

3 Claims, No Drawings

BIOCOMPOSITE AND/OR BIOMATERIAL WITH SUNFLOWER SEED SHELLS/HUSKS

The present application is a divisional of U.S. patent application Ser. No. 14/356,980 filed on May 8, 2014, which is a U.S. National Stage application of PCT/EP2012/070348, filed on Oct. 12, 2012, which claims priority from German Patent Application Nos. DE 10 2011 086 319.2, filed on Nov. 14, 2011, and DE 10 2012 209 482.2, filed on Jun. 5, 2012, the disclosures of which are incorporated by reference herein in their entirety.

FIELD OF THE INVENTION

It is noted that citation or identification of any document in this application is not an admission that such document is available as prior art to the present invention.

The invention relates to a biocomposite or a biomaterial. These biomaterials or biocomposites are already known by way of example as "wood-plastic composites" (abbreviated to "WPC"), i.e. wood-plastic composite materials. Other terms used for these are "wood(-fiber) polymer composites" and "wood-polymer materials". The abovementioned biomaterials are thermoplastically processable composite materials which are produced from various proportions of wood—typically wood flour—plastics, and additives. They are mostly processed by modern processes of plastics technology, for example extrusion, injection molding, rotomolding, or by means of press techniques, or else by the thermoforming process.

Processing for WPCs is known to involve not only wood (in particular wood flour) but also other vegetable fibers, for example kenaf, jute, or flax.

The present invention aims to improve the WPCs known hitherto, i.e. the natural-fiber-reinforced plastics known hitherto, and in particular to reduce costs for the starting materials in the production thereof.

In the WPCs known hitherto, the proportion of wood is regularly above 20%, and there are therefore by way of example known WPCs in which the proportion of wood fiber or of wood flour is from 50 to 90%, these materials being embedded in a plastics matrix made of polypropylene (PP) or less frequently of polyethylene (PE). Because the wood is sensitive to heat, the only possible processing temperatures are below 200° C. At higher temperatures the wood suffers thermal changes and decomposition, and this alters the overall properties of the material undesirably.

Additives are also added in the natural-fiber-reinforced plastics known hitherto, in order to optimize specific properties of the materials. Examples of these properties of the materials are the bonding between wood and plastic, flowability, fire protection, coloring and, particularly for external applications, also resistance to weathering, to UV, and to pests.

It is also already known that a WPC can be produced by using a mixture of 50% of polyvinyl chloride (PVC) and 50% of wood fibers. WPCs of this type based on thermoplastically processable thermosets, such as modified melamine resin, are likewise under development, as is also the processing of products similar to wood, such as bamboo, the term used for these then being "bamboo-plastic composites" ("BPCs"). The classification "BPC" is used for WPCs where bamboo fibers have replaced wood fibers.

The advantages of the biomaterials described over traditional wood-based materials such as particle board or plywood are the unrestricted, three-dimensional moldability of the material and greater resistance to moisture. In comparison with solid plastics, WPCs offer greater stiffness and a markedly smaller coefficient of thermal expansion. The biomaterials available hitherto also have the disadvantage of lower breaking strength than sawn timber; moldings with inserted reinforcement have greater breaking strength than solid moldings and sawn timber. The water absorption of moldings with no final coating is higher than that of solid plastics moldings or moldings with film coating or with flowable coating.

It is known that the biomaterials described hitherto can be used as decking or for the production of boards, and it is equally known that WPC can be used particularly in the construction industry, the automobile industry and furniture industry, the outdoor sector for floorcoverings (patios, swimming pools, etc.), facades, and furniture, in particular as replacement for timber from tropical regions.

There are also many known seating and shelving systems made of WPCs. Other applications are writing implements, containers, and household equipment, and WPC biomaterials are used in the engineering sector as profiles for electrical insulation, and in the automobile industry in particular as interior door cladding and parcel shelves.

SUMMARY OF THE INVENTION

It is now an object of the invention to improve the WPC biomaterials available hitherto, and in particular to make these less expensive, and to improve the properties of these materials.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The invention proposes use of sunflower seed shells/husks instead of wood, bamboo, or other fiber products similar to wood as starting material for WPC products, and for the production of products of this type.

Sunflowers are cultivated in all regions worldwide, and the main objective of sunflower production is to obtain sunflower seeds and in particular the contents thereof. Before the seeds are processed, the sunflower seed has to be shelled, and this means that the actual sunflower seed is freed from its shell/husk. Large quantities of said shells/husks are produced during sunflower seed production, and are a type of waste product of sunflower seed production that can also be used for other purposes, for example as animal feed, in biogas plants, etc.

The first advantage of sunflower seed shells/husks is not only that large quantities thereof are produced but also that they are intrinsically relatively small and therefore require only a small amount of further processing, such as comminution, in order to form the starting product for an "SPC" ("sunflower-plastic composite"). The energy cost associated with the comminution or grinding of sunflower seed shells/husks is markedly lower than that for the production of wood flour for WPC production.

Another particular advantage of the use of sunflower seed shells is that these are very suitable for use for an SPC which serves for the production of packaging, for example a bottle or jar, in particular of food packaging.

However, a first trial has shown in particular that comminuted or ground sunflower seed shells/husks have excellent suitability for processing in the form of SPC and can therefore produce excellent food packaging which in no way causes any disadvantageous or other alteration to the taste of the food that is stored.

The invention therefore also represents a very sustainable approach to conservation of resources in production of packaging material or the like.

The processing of the comminuted or ground sunflower seed husks can advantageously proceed in the same way as the production of wood-plastic composites.

The proportion of the sunflower seed husks here can be from 50 to 90% of the final product, and particular preference is given to a polypropylene material as plastics matrix, but it is also possible to use a polyethylene material or polyvinyl material, although the latter appears to be less suitable.

The heat-sensitivity of sunflower seed husks (sunflower shells) certainly permits processing thereof at processing temperatures of up to 200° C., and temperatures of up to 210° C. to 240° C., preferably 230° C., are also possible; at higher temperatures, thermal changes or decomposition could occur.

Additives are added to optimize specific properties of the materials, for example the bonding between the sunflower seed husks and the plastic, the flowability of the sunflower seed husks/plastic mixture, fire protection, coloring and, particularly for food or drink applications, resistance to oil, to UV, and to pests.

Particular preference is given to a mixture of 50% of PP (polypropylene), PE (polyethylene), or ABS (acrylonitrile-butadiene-styrene) on the one hand and, on the other hand, 50% of sunflower seed husks. This type of mixture therefore uses on the one hand a fraction made of PP and on the other hand a fraction made of (ground) sunflower seed husks (sunflower shells) in the same quantity, where the sunflower shells have the properties described in the present application in respect of grain size, water content, oil content, etc. thereof. It is also possible to use PVC (polyvinyl chloride) or PS (polystyrene) or PLA (polylactide) instead of the plastics described, such as PP, PE, or ABS. The processing temperature is then sometimes determined by the plastics component if the maximum processing temperature thereof is below that of the shell material.

The inventive sunflower-plastic composite (SPC) here can be processed by a process which is already well established in plastics production. Particular preference is given to processing by means of injection molding, but it is also entirely conceivable and possible that any other type of plastics processing is used.

In the case of injection molding, the material, i.e. the mixed material composed of plastic on the one hand and of comminuted or ground sunflower seed husks on the other hand has to be homogeneous and amenable to problem free metering, in order that the entire melt has good flowability.

A desirable grain size of the sunflower seed husk material is therefore from 0.05 mm to 2 mm, preferably less than 1 mm. A particularly advantageous grain size of the sunflower shells (of the sunflower seed husk material) is from 0.01 to 0.5 mm, particularly preferably from 0.1 to 0.3 mm, and compliance with this grain size can also be achieved where necessary in that most of the husk material, e.g. 90%, is within the abovementioned range, and from 10 to 20% is outside of said range (by virtue of tolerance inaccuracies).

It is preferable that the sunflower seed husk material has a high level of dryness, i.e. that the water content thereof is from 1 to 9%, preferably from 4 to 8%.

The husk material (shell material) can also have fat content which is up to 6%, preferably at most 4% or less. Because of the geometry of the sunflower seed husks, and because of low impact resistance, the wall thicknesses are designed to be thicker in the injection-molding process than when plastics pellets are used alone. The substantially higher heat distortion temperature is advantageous, and provides stiffness to the composition at higher temperatures. SPC moldings can therefore be demolded at higher temperatures.

The invention is particularly suitable for use of an SPC for the production of packaging, preferably of food packaging, for example a jar, a bottle, or the like. This type of packaging can also if necessary be provided with an internal and/or external coating, in order to render the entire packaging more robust, and in order to exclude any possible sensory effect on the packaged material, such as oil or drinks, etc., due to the packaging material, i.e. the SPC.

In the present application, the use of sunflower seed husks/sunflower seed shells is the preferred use of a husk for the production of a "bioplastic composite".

The invention can also use, instead of sunflower seed husks or shells of sunflower seeds, other shells and, respectively, husks of other fruits, for example of nuts (in particular hazelnuts, walnuts, brazil nuts, beechmast, acorns) or of cereals, in particular rye, wheat, oats, triticale, barley, maize, rice, millet, or the like.

As already mentioned, it is already known that wood or wood fibers and the like can be used as compound material for natural-fiber-reinforced polymers, in order to produce a wood-plastic compound material which is then subsequently further processed. During the further processing here, the compound material is melted or in any event greatly heated, in order to render it flowable and therefore processable. However, in the case of wood-plastic composite materials this is very problematic when a temperature of 200° C. is reached, since in the temperature range starting at 200° C. the thermal stress to which the wood is exposed is excessive, and the entire material suffers from the resultant adverse effect. However, the polymers, i.e. polymer matrices such as polyethylene (PE), polypropylene (PP), polystyrene (PS), or polyvinyl chloride (PVC), have properties such as creep behavior and low heat distortion temperature which make them unsuitable for most structural applications unless they can be processed at high temperatures, namely at temperatures markedly above 200° C., for example in injection molding or the like. Load-bearing elements made of wood-plastic composite material also have to have significantly better mechanical properties than PP- or PE-based wood-plastic composite (WPC).

As mentioned, the use of high-performance plastics as matrix is subject to very severe restriction from the prescribed melting point (up to 200° C.). Added to this, engineering polymers that might be considered have very high prices which are unlikely to be economically viable.

Tests have now shown that processing temperatures achievable with the SPC biomaterial of the invention extend as far as 300° C., and that processing in the range from 220° C. to 250° C. is never associated with any degradation of the material, and that it is also possible to offer significant improvements in mechanical properties at an acceptable price.

The biomaterial or biocomposite of the invention, using sunflower seed shells/husks, can be used with excellent results for plastics parts in the automotive sector, films, and also carrier bags, packaging, industrial products and consumer products, decking, and furniture. Examples of possible uses in the automotive sector are shells of wheelhousings (known as wheel arches), the engine cover and also the underbody cladding. In the sector of films and carrier bags, particular mention may be made of the use of the biomaterial of the invention for the production of silo films, packaging films and carrier bags, and in the packaging and containers sector particular mention may be made in the invention of the production of food-and-drink packaging, trash containers, and plastics jars, and corresponding containers. Another particular possible inventive use of the biomaterial of the invention is the production of drinks crates, breadboxes, and plant pots, and also the production of portable equipment for the household and garden sector, for example chairs, benches, tables, and also of decking and doors.

Finally, it has been found that the impact resistance of the biomaterial of the invention can be adjusted in a desired manner by varying, on the one hand, the flower content of the sunflower seed shell material and/or, on the other hand, the grain size thereof.

As mentioned, the biomaterial of the invention or the biocomposite of the invention comprises sunflower seed shells/husks, and the biomaterial of the invention or the biocomposite of the invention therefore comprises sunflower seed shells/husks as base material. Where the expression sunflower seed husk material is used in the present application, this means the same as sunflower shells, sunflower seed shells, and sunflower husks. The material involved is always the shell material of sunflower seeds.

If, after the shell material has been separated from the seed, i.e. after shelling, the parameters of the material in respect of water content, grain size, or fat content, differ from what is used with particular advantage according to the present application, the material is correspondingly treated and processed. If by way of example the shell material has a water content of 15%, said water content is reduced specifically by drying to the desired value. If the shell material after shelling has a grain size that is too high, the desired grain size is achieved by subsequent grinding. If the shell material after shelling has excessive fat content, the fat content in the shells is specifically reduced by a conventional fat absorption process (also achievable by heat treatment).

Typical compositions of a biomaterial are mentioned below, and on the one hand comply with desired technical properties, and on the other hand are markedly more advantageous than previous (bio)plastics.

1. Embodiment: "ABS 300" Bioplastic 520 kg of PP (polypropylene), 300 kg of shells, 30 kg of additive (odor), 30 kg of additive (impact resistance), 30 kg of additive (moisture), 30 kg of additive (flow property), 30 kg of additive (adhesion promoter), 30 kg of additive (stripping agent).

A mixture of said material is then introduced in the usual way to a compounding process in such a way that the desired plastic in the desired form can then be produced from the compounded material, an example being extrusion or injection molding or rotomolding or press techniques or thermoforming processes.

An example of the suitable adhesion promoter additive is the product "SCONA TPPP 8112 FA" (adhesion modifier for polypropylene-natural-fiber compounds and in TPES compounds) from BYK, Additives & Instruments, Technical Data Sheet, Issue 07/11, a product from, and a company of, the ALTANA group. The Technical Data Sheet for this product is listed as table 1.

A suitable stripping agent additive is the product "BYK-P 4200" (stripping agent for reducing odor and VOC emissions in thermoplastic compounds), Data Sheet X506, Issue 03/10, from BYK Additives & Instruments, a company of the ALTANA group. The Data Sheet for the product is attached as table 2.

A product that appears to be particularly suitable as additive to counter odor generation is "Ciba IRGANOX 1076" (phenolic primary antioxidant for processing and long-term thermal stabilization), a product from Ciba. The Data Sheet for this product is attached as table 3.

Another additive suitable for process stabilization is the product "Ciba IRGAFOS 168" (processing stabilizer) from Ciba. A description of this product is attached as table 4.

A particularly suitable polypropylene material is the product "Moplen EP300K-PP-Lyondell Basell Industries". A Data Sheet for this product is attached as table 5.

Another composition ($2^{nd}$ embodiment) of a different biomaterial with the in-house name "PP 50" is as follows:
45% of Moplen EP300K PP pellets
50% of sunflower shells
Irgafos 168, powder, 0.20%
Irganox 1076, powder, 0.30%
BYK P 4200, 2.00%
Scona TPPP 8112 FA, powder, 2.5%

The abovementioned constituents are compounded in the usual way, and can then be processed for the production of the desired plastics product of the present application in processes described, e.g. extrusion, injection molding, thermoforming, rotomolding, press techniques.

When the term compounding is used in the present application, it means the plastics-compounding process to which the biomaterial or bioplastic of the invention is subjected, and this means specifically the value-added process which describes the specific optimization of the property profiles of the biomaterial of the invention through admixture of additional substances (fillers, additives, etc.). The compounding process takes place by way of example in an extruder (e.g. a twin-screw extruder, but it is also possible to use a contrarotating twin-screw extruder or else a planetary-gear extruder and co-kneader for this purpose) and comprises inter alia the process operations of conveying, melting, dispersion, mixing, devolatilizing, and compression.

The purpose of the compounding process is to provide, from a raw plastics material, a plastics molding composition with the best-possible properties for processing and use. The objects of the compounding process here are to change the particle size, to incorporate additives, and to remove undesired constituents.

The compounding process finally produces an outgoing biomaterial which comprises the individual outgoing constituents, i.e. shell material, polypropylene, additives, etc., and specifically in mixed form. The compounded biomaterial product is generally produced in the form of intermediate product taking the form of a pellet or the like, in such a way that it can then be further processed in a plastics-processing machine to produce the desired plastics product, e.g. in an injection-molding machine.

By means of the invention it is possible to combine a byproduct of sunflower processing with plastic and thus, in a manner that conserves resources and is sustainable, to achieve a reduction of from 30% to 70% in the dependency of plastics production on petroleum.

Associated with this is the very favorable effect that the processing of the biocomposite or biomaterial of the invention also has on the $CO_2$ cycle, and also on the life cycle assessment of the products produced therefrom.

By means of the invention it is also possible to achieve the processing of the biomaterial of the invention—which can also be called biopolymer—at up to 300° C. (this having been found in initial tests) and to provide a novel biomaterial (biopolymer) with significantly improved mechanical properties at an acceptable price.

The biomaterial (biopolymer) of the invention can in particular be used in all product segments, and existing tooling can be used without difficulty for processing here.

The aim of the invention, to develop a biomaterial (biopolymer) which has a very high level of biofill and which nevertheless can be processed without difficulty in the form of industrial bioplastic, has been convincingly achieved. Finally, it is also possible, instead of the plastics described (PP, PE, ABS, PVC (polyvinyl chloride), PS (polystyrene)), to admix, or compound, a polylactide (polylactic acid) (abbreviated to PLA) with the plastics shells (the flour from these). The biological content of the entire plastic is thus again increased. PLA plastics per se are already known and are generally composed of many lactic acid molecules chemically bonded to one another, and are members of the polyester class. Polylactide (PLA) plastics are biocompatible.

The biomaterial of the invention can be used for the production of very different types of products, for example for the production of packaging (food packaging), of an automobile part (e.g. cladding for the wheelhousing), for portable equipment (tables, chairs, benches), decking, or doors, and the like. The biomaterial of the invention can also be used to produce baskets or containers, in particular those used in the food industry.

While this invention has been described in conjunction with the specific embodiments outlined herein, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the inventions as defined in the claims.

Below: Tables 1, 2, 3, 4 and 5.

TABLE 1

| BYK | |
|---|---|
| Additives & Instruments | Technical Data Sheet |
| SCONA TPPP 8112 FA | Issue Jul. 2011 |

Adhesion modifier for polypropylene-natural-fiber compounds and in TPES compounds Chemical structure

| SCONA TPPP 8112 FA | Polypropylene, highly functionalized with maleic anhydride |
|---|---|

| Properties | | |
|---|---|---|
| Melt index in g/10 min (MFI 190° C., 2.16 kg) | Loss on drying in % 3 h/110° C. | MA content in % |
| SCONA TPPP 8112 FA | | |
| >80 | <0.5 | 1.4 |

The values stated are typical, but do not represent a specification.

Recommended addition quantities

| | Addition quantity in % of supply form, based on entire formulation |
|---|---|
| SCONA TPPP 8112 FA | From 0.8 to 3, dependent on natural fiber content and on PP content in TPES compound |

Incorporation and procedure
Homogeneous dispersion of the modifier in the compound Application sectors

| SCONA TPPP 8112 FA | Coupling agent in polypropylene-natural-fiber compounds<br>Adhesive modifier in TPES compounds |
|---|---|

A member of ALTANA
Technical Data Sheet
Issue Jul. 2011

TABLE 1-continued

| | Properties and advantages |
|---|---|
| SCONA TPPP 8112 FA | Good flow properties in highly filled TPES compounds<br>Significant improvement in mechanical properties in polypropylene-natural-fiber compounds<br>Reduction of water absorption in polypropylene-natural-fiber compounds<br>Good suitability for masterbatch production |

Notes
Supply form: Powder

| | Storage and transport |
|---|---|
| SCONA TPPP 8112 FA | Storage temperature max. 35° C.<br>Relative humidity <80%<br>Avoid direct exposure to sunlight and avoid contact with water |
| BYK Kometra GmbH<br>Value Park: Y 42<br>06258 Schkopau<br>Germany | ANTI-TERRA ®, ATEPAS ®, BYK ®, BYK ®-DYNWET ®, BYK ®-SILCLEAN ®, BYKANOL ®, BYKETOL ®, BYKJET ®, BYKOPLAST ®, BYKUMEN ®, DISPERBYK ®, DISPERPLAST ®, ISAROL ®, LACTIMON ®, NANOBYK ®, SCONA ®, SILBYK ® and VISCOBYK ® are registered trademarks of BYK-Chemie AQUACER ®, AQUAMAT ®, AQUATIX ®, CERACOL ®, CERAPAK ®, CERAFLOUR ®, CERAMAT ®, CERATIX ®, HORDAMER ® and MINERPOL ® are registered trademarks of BYK-Cera |
| Tel: +49 3461 4960-60<br>Fax: +49 3461 4960-70<br>Info@byk(dot)com<br>www(dot)byk(dot)com/additives | The information above is given to the best of our knowledge. Because of the multitude of formulations and conditions of production, operation and processing, the use of the product must be checked in relation to the specific conditions used by the processor. The information provided in this Data Sheet is not to be interpreted as assurance of any particular property; we bear no responsibility for use of the product outside of the application sectors recommended; no liability can be derived from the above—and this also applies to any patent infringement<br>This Issue replaces all previous versions—printed in Germany |

TABLE 2

BYK

| Additives & Instruments | Data Sheet X506 |
|---|---|
| BYK-P 4200 | Issue Mar. 2010 |

Stripping agent to reduce odor and VOC emissions in thermoplastic compounds

| | Chemical structure |
|---|---|
| BYK-P 4200 | Aqueous solution of polymeric, surface-active substances adsorbed on a polypropylene carrier |

| | Properties | | |
|---|---|---|---|
| | Melting point in ° C. | MVR in accordance with ISO 1133 $cm^3/10$ min | Bulk density $kg/m^3$ |
| BYK-P 4200 | 160 | 25 | 370 |

The values stated are typical, but do not represent a specification.

| | Recommended addition quantities |
|---|---|
| | Additive quantity in % of supply form, based on entire formulation |
| BYK-P 4200 | From 0.5 to 2.0% |

Incorporation and procedure
BYK-P 4200 should be added to the plastic during or prior to compounding process TABLE 2-continued

| | Application sectors | | |
|---|---|---|---|
| | Polypropylene | Polyethylene | ABS |
| BYK-P 4200 | ■ | ■ | ☐ |

■ particularly recommended application sector ☐ recommended application sector
Function
The effect of adding BYK-P 4200 is to reduce the level of compound constituents that cause
odor and emissions, or even to remove these entirely, during vacuum devolatilization.

A member of ALTANA
Data Sheet X506
Issue Mar. 2010

| Properties and advantages | |
|---|---|
| BYK-P 4200 | Major reduction in level of odor and VOC emissions<br>adverse effect on mechanical and optical properties<br>No additional capital expenditure necessary for plant extensions<br>Easy to use |

Notes
To achieve efficient performance of the additive, vacuum devolatilization using at least
100 mbar is recommended. Wherever possible, operations should use only one vent shortly
before the end of the extruder.

| | |
|---|---|
| BYK-Chemie GmbH<br>PO Box 10 02 45<br>46462 Wesel<br>Germany | ANTI-TERRA ®, ATEPAS ®, BYK ®, BYK ®-DYNWET ®,<br>BYK ®-SILCLEAN ®, BYKANOL ®, BYKETOL ®,<br>BYKOPLAST ®, BYKUMEN ®, DISPERBYK ®,<br>DISPERPLAST ®, ISAROL ®, LACTIMON ®,<br>NANOBYK ®, SILBYK ® and VISCOBYK ® are registered<br>trademarks of BYK-Chemie<br>AQUACER ®, AQUAMAT ®, AQUATIX ®, CERACOL ®,<br>CERAPAK ®, CERAFLOUR ®, CERAMAT ®, CERATIX ®<br>and MINERPOL ® are registered trademarks of BYK-Cera |
| Tel: +49 281 670-0<br>Fax: +49 281 65735<br>Info@byk(dot)com<br>www(dot)byk(dot)com/additives | LICOMER is a registered trademark of Clariant<br>The information above is given to the best of our knowledge.<br>Because of the multitude of formulations and conditions of<br>production, operation and processing, the use of the product<br>must be checked in relation to the specific conditions used by<br>the processor. The information provided in this Data Sheet is<br>not to be interpreted as assurance of any particular property;<br>we bear no responsibility for use of the product outside of<br>the application sectors recommended; no liability can be<br>derived from the above—and this also applies to any patent<br>infringement<br>This Issue replaces all previous versions—printed in<br>Germany<br>Material Data Center | Datasheet Moplen EP300K |

TABLE 5

Home Imprint About
Material Data Center is a leading international information system for the plastics industry.
Material Data Center offers a comprehensive plastics database, calculation tools, CAE
interfaces, a literature database and an application database. For more information about
Material Data Center visit www(dot)materialdatacenter(dot)com
This is the free Material Data Center Datasheet of Moplen EP300K-PP-LyondellBasell
Industries
Material Data Center offers the following functions for Moplen EP300K:
unit conversion, PDF datasheet print, comparison with other plastics, snap fit
calculation, beam deflection calculation
Check here, which other Moplen datasheets, application examples or technical
articles are available in Material Data Center Use the following short links to get directly to the properties of interest in this datasheet:

Rheological properties
| ISO Data | Value | Unit | Test Standard |
|---|---|---|---|
| Melt volume-flow rate (MVR) | 5.4 | cm$^3$/10 min | ISO 1133 |
| Temperature | 230 | ° C. | ISO 1133 |
| Load | 2.16 | kg | ISO 1133 |

TABLE 5-continued

Home Imprint About
Material Data Center is a leading international information system for the plastics industry.
Material Data Center offers a comprehensive plastics database, calculation tools, CAE
interfaces, a literature database and an application database. For more information about
Material Data Center visit www(dot)materialdatacenter(dot)com
This is the free Material Data Center Datasheet of Moplen EP300K-PP-LyondellBasell
Industries
Material Data Center offers the following functions for Moplen EP300K:
unit conversion, PDF datasheet print, comparison with other plastics, snap fit
calculation, beam deflection calculation
Check here, which other Moplen datasheets, application examples or technical
articles are available in Material Data Center

| | | | |
|---|---|---|---|
| Melt flow index (MFI) | 4 | g/10 min | ISO 1133 |
| MFI temperature | 230 | ° C. | ISO 1133 |
| MFI load | 2.16 | kg | ISO 1133 |

| Mechanical properties ISO Data | Value | Unit | Test Standard |
|---|---|---|---|
| Tensile Modulus | 1200 | MPa | ISO 527-1/-2 |
| Yield stress | 27 | MPa | ISO 527-1/-2 |
| Yield strain | 7 | % | ISO 527-1/-2 |
| Strain at break | 50 | % | ISO 527-1/-2 |
| Charpy impact strength (+23° C.) | N | kJ/m$^2$ | ISO 179/1eU |
| Charpy notched impact strength (+23° C.) | 10.5 | kJ/m$^2$ | ISO 179/1eA |
| Ball indentation hardness | 53 | MPa | ISO 2039-1 |

| Thermal properties ISO Data | Value | Unit | Test Standard |
|---|---|---|---|
| Temp. of deflection under load (0.45 MPa) | 75 | ° C. | ISO 75-1/-2 |
| Vicat softening point (A) | 150 | ° C. | ISO 306 |
| Vicat softening point (50° C./h 50N) | 71 | ° C. | ISO 306 |

| Other properties ISO Data | Value | Unit | Test Standard |
|---|---|---|---|
| Density | 900 | kg/m$^3$ | ISO 1183 |

Characteristics
Processing
Injection molding, other
extrusion, thermoforming
Special characteristics
High impact/impact modified
Features
Impact copolymer
Applications
General purpose
Regional availability
Europe, Middle East/Africa Disclaimer
Copyright M-Base Engineering + Software GmbH. M-Base Engineering + Software GmbH assumes no liability
for the system to be free of errors. The user takes sole responsibility for the use of this data under the exclusion
of every liability from M-Base; this is especially valid for claims of compensation resulting from consequential
damages. M-Base explicitly points out that any decision about use of materials must be double checked with the
producer of this material. This includes all contents of this system. Copyright laws are applicable for the content
of this system.
Material Data Center is provided by M-Base Engineering + Software GmbH. M-Base Engineering + Software
GmbH assumes no liability for the system to be free from errors. Any decision about use of materials must be
checked in detail with the relevant producer. Additional information about this material, for example substance
group, producer contact address, and also in some cases datasheets and application examples can be found at
www(dot)materialdatacenter(dot)com. Some of the information is restricted to registered users.
On the Start page there is a link to free Registration.

The invention claimed is:

1. A process for the production of a sunflower-based composite material, comprising:
separating sunflower seed husks from sunflower seed cores by a peeling process;
processing the separated sunflower seed husks so that:
the water content of the sunflower seed husks is reduced to no more than 15% of the mass of the sunflower seed husks;
the sunflower seed husks are comminuted or ground to a desired grain size; and
the fat content of the sunflower seed husks is reduced by subjecting the sunflower seed husks to a fat absorption process; and
compounding the processed sunflower seed husks with a plastics material to produce the sunflower-based composite material;
wherein the fat content of the sunflower seed husks is reduced to no more than 6% of the mass of the sunflower seed husks.

2. The process for the production of the sunflower-based composite material according to claim 1;

wherein the fat content of the sunflower seed husks is reduced to no more than 5% of the mass of the sunflower seed husks.

3. The process for the production of the sunflower-based composite material according to claim 2; wherein the fat content of the sunflower seed husks is reduced to no more than 4% of the mass of the sunflower seed husks.

\* \* \* \* \*